L. Smith,
Lifting Gate,
Nº 6,488. Patented May 29, 1849.
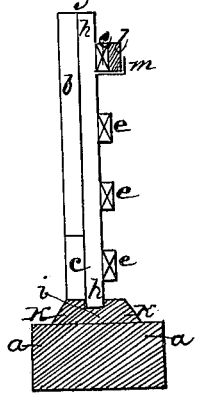
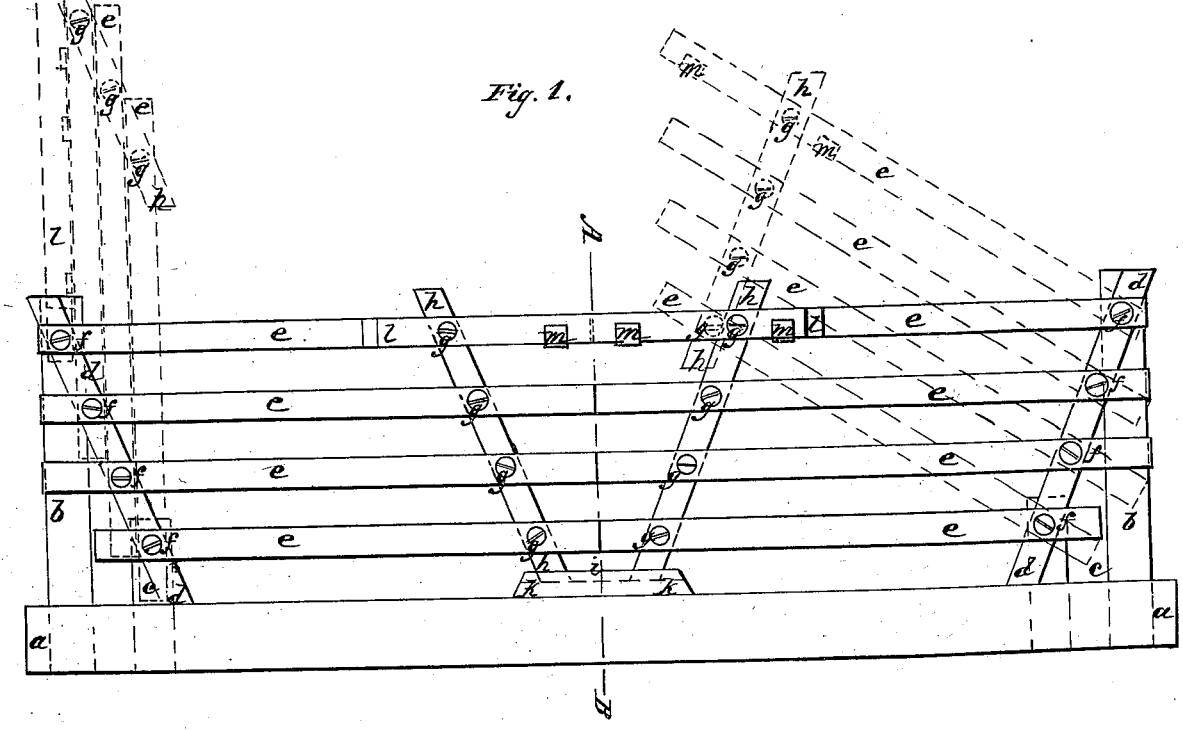

UNITED STATES PATENT OFFICE.

LORENZO SMITH, OF EASTON, MASSACHUSETTS.

GATE.

Specification of Letters Patent No. 6,488, dated May 29, 1849.

*To all whom it may concern:*

Be it known that I, LORENZO SMITH, of Easton, in the county of Bristol and State of Massachusetts, have invented certain new and useful Improvements in Gates, and that the following description, taken in connection with the accompanying plate of drawings, hereinafter referred to, forms a full and exact specification of the same, wherein I have set forth the nature and principles of my said improvements by which my invention may be distinguished from others of a similar class, together with such parts as I claim, and desire to have secured to me by Letters Patent.

The figures of the accompanying plate of drawings, represent my improvements.

Figure 1 is a front view of a double gate, constructed on my improved plan, showing the two halves of the gate in several positions, the black lines representing it as closed, and the red lines showing one-half in the position it would occupy were the gate entirely open, and the other half midway between the open and closed positions. Fig. 2 is a central vertical section taken in the plane of the line, AB, Fig. 1.

It is well known that in swinging gates, either single or double, which are used to close a wide opening, as on railroads, &c., it is exceedingly difficult to get hinges which will sustain the strain, or to so construct the frame of the gate with braces, &c., as to keep it horizontal when in motion; or in other words, to prevent the ends not connected with the hinges from "sagging."

By my improvements these difficulties are entirely obviated, and the swinging of the gates, as well as the use of hinges is superceded; the two halves of the gate turning up vertically, and being constructed for this purpose on the principle of the old fashioned parallel ruler used by surveyors.

The gate may be framed upon a horizontal sill, *a, a*, extending across the opening or otherwise, according to the taste of the builder.

*b, b,* are two long vertical posts, either mortised into the sill, *a a* or set firmly in the ground at the opposite sides of the gateway.

*c c* are two shorter posts set a little inward from the vertical posts, *b b*, and two stationary diagonal bars, *d d, d d*, are attached to these posts on each side of the gateway, as shown in Fig. 1.

Four or more parallel rails, *e, e, e, e—e, e, e, e* are connected near one of their ends to each of these diagonal bars by screws rivets or pins, *f, f, f, f*, &c., in such manner as to permit these said rails, *e, e*, &c., to turn freely upon them, the said pins, *f, f f f*, &c., being so arranged as to answer the double purpose of bearing and confining pins, as shown in Fig. 1. The said rails, *e, e, e*, &c., near their other ends, and at equal distances from the pins, *f, f*, &c., are similarly connected by screws, rivets or pins, *g, g, g*, &c., to the movable diagonal bars or braces, *h h, h h*, which are set, one on each half of the gate, in parallel positions to the stationary diagonal bars, *d d, d d*, above referred to.

When the gate is closed the feet of the movable diagonal bars rest in a groove, *i*, in the central block, *k k*, Fig. 2, fitted firmly on the sill, *a a*, or in the earth, and the rails, *e, e, e,* &c., are in the horizontal position indicated by the black lines in Fig. 1.

When it is desired to open the gate each half of the same should be lifted, and the rails, *e, e*, &c., will turn freely on the pins, *f f* and *g g*, retaining their parallelism, while the bars, *h h, h h*, will also turn, retaining likewise their parallelism with the stationary bars, *d d, d d;* and the whole may be made to assume the vertical position shown for one-half of the gate, by red lines in Fig. 1, leaving the gate-way clear for the passage of vehicles, &c. A turning bar, *l l*, is fitted on the pins, *g g*, so as to turn on the same, and fit into the several right angular hasps, *m—m—m*, secured to the upper rails, *e, e*, and thereby connect, and fasten the two halves of the gate together. When the gate is open, this fastening bar may be placed in the position shown by red lines in Fig. 1, so as not to mar the symmetrical appearance of the gate.

Any other fastening may be used in lieu of the one described if deemed desirable, and in case the two halves of the gate are very heavy, counterpoising weights, may be used in a manner which will be readily understood without further description. A single gate, it will also be seen without further suggestion, may be arranged to work like one half of the gate hereinabove described.

Having thus described my invention I shall state my claims as follows:

What I claim as my invention, and desire to have secured to me by Letters Patent is,

A single or double gate constructed substantially as hereinabove described, so as to turn up vertically by the parallel movement of the rails, &c., in lieu of swinging each way in the ordinary manner.

In testimony that the foregoing is a true description of my said invention and improvements I have hereto set my signature this twenty-seventh day of January, in the year 1849.

LORENZO SMITH.

Witnesses:
 ISAAC WINSHIP,
 WILLIAM WINSHIP.